(12) United States Patent
Weiser et al.

(10) Patent No.: US 6,986,420 B2
(45) Date of Patent: Jan. 17, 2006

(54) MODULAR CONVEYOR BELTS WITH SPLIT BELT MODULES

(75) Inventors: David C. Weiser, River Ridge, LA (US); Kyle J. Sedlacek, New Orleans, LA (US); Andrew A. Corley, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 98 days.

(21) Appl. No.: 10/707,849

(22) Filed: Jan. 16, 2004

(65) Prior Publication Data

US 2004/0129539 A1 Jul. 8, 2004

Related U.S. Application Data

(62) Division of application No. 09/992,765, filed on Nov. 6, 2001, now Pat. No. 6,681,922.

(51) Int. Cl.
 *B65G 17/24* (2006.01)
(52) U.S. Cl. ........................ 198/853; 198/850
(58) Field of Classification Search .............. 198/853, 198/847, 850
 See application file for complete search history.

(56) References Cited

U.S. PATENT DOCUMENTS

| | | | |
|---|---|---|---|
| 2,954,113 A | 9/1960 | Hibbard et al. ............. 198/189 |
| 4,556,142 A | 12/1985 | Lapeyre ...................... 198/822 |
| 4,832,183 A | 5/1989 | Lapeyre ...................... 198/699 |
| 5,238,099 A | 8/1993 | Schroeder et al. .......... 198/456 |
| 5,261,525 A | 11/1993 | Garbagnati ................. 198/779 |
| 5,361,893 A | 11/1994 | Lapeyre et al. ............. 198/853 |
| 5,377,819 A | 1/1995 | Horton et al. .............. 198/853 |
| 5,469,956 A | 11/1995 | Greve et al. ............. 198/699.1 |
| 5,921,379 A * | 7/1999 | Horton ....................... 198/852 |
| 5,947,361 A | 9/1999 | Berger et al. ................. 226/92 |
| 6,148,990 A | 11/2000 | Lapeyre et al. ............. 198/779 |
| 6,209,714 B1 * | 4/2001 | Lapeyre et al. ............. 198/779 |
| 6,318,544 B1 | 11/2001 | O'Connor et al. .......... 198/853 |
| 6,347,699 B1 * | 2/2002 | Ramsey ...................... 198/852 |
| 6,367,616 B1 * | 4/2002 | Lapeyre et al. ............. 198/779 |
| 6,398,015 B1 * | 6/2002 | Sedlacek et al. ............ 198/779 |
| 6,444,466 B1 * | 9/2002 | Ward et al. .................. 435/375 |
| 6,471,049 B1 * | 10/2002 | van Esch et al. ........... 198/853 |
| 6,494,312 B2 * | 12/2002 | Costanzo .................... 198/779 |
| 6,564,933 B2 * | 5/2003 | Morimoto et al. .......... 198/850 |
| 6,571,937 B1 * | 6/2003 | Costanzo et al. ........... 198/779 |
| 6,648,129 B2 * | 11/2003 | Sedlacek ..................... 198/850 |
| 6,681,922 B2 * | 1/2004 | Corley et al. ............... 198/853 |
| 6,705,460 B2 * | 3/2004 | Weiser et al. ............... 198/850 |
| 6,708,818 B2 * | 3/2004 | Kato et al. .................. 198/853 |
| RE38,607 E * | 10/2004 | Guldenfels et al. ......... 198/834 |

FOREIGN PATENT DOCUMENTS

| | | |
|---|---|---|
| EP | 0 083 119 A1 | 7/1983 |
| EP | 0 215 983 A1 | 4/1987 |
| EP | 1 316 519 A3 | 8/2003 |
| NL | 1005979 | 11/1998 |

* cited by examiner

*Primary Examiner*—Douglas Hess
(74) *Attorney, Agent, or Firm*—James T. Cronvich

(57) ABSTRACT

Modular plastic conveyor belts constructed of split belt modules. Each module includes a first piece and a second piece. Side-by-side first pieces mate with side-by-side second pieces to form a row of belt modules. Each row has sets of hinge eyes along opposite ends. Hinge pins extending through the hinge eyes at the ends of each row connect the pieces in the row together to adjacent belt rows. Other components, such as rollers, can be inserted into and removed from the unmated pieces and retained in place by retention structure when the module pieces are mated.

17 Claims, 10 Drawing Sheets

MODULAR CONVEYOR BELTS WITH SPLIT BELT MODULES

CROSS REFERENCE TO RELATED APPLICATIONS

This application is a division of application Ser. No. 09/992,765, filed Nov. 6, 2001 now U.S. Pat. No. 6,681,922.

BACKGROUND OF INVENTION

The invention relates generally to power-driven conveyors and, more particularly, to modular conveyor belts constructed of a series of rows of belt modules split into multiple pieces and connected together by hinge pins.

Conventional modular conveyor belts and chains are constructed of modular links, or belt modules, arranged end to end and often side by side in belt rows. The modules typically extend from a top article-engaging surface to a bottom drive surface through their thickness. Spaced-apart hinge eyes extending from each end of the modules include aligned openings. The hinge eyes along one end of a row of modules are interleaved with the hinge eyes along one end of an adjacent row. Pivot rods, or hinge pins, journalled in the aligned openings of interleaved hinge eyes, connect adjacent rows together end to end to form a conveyor belt capable of articulating about a drive sprocket or drum at the hinge formed by the interleaved hinge eyes between adjacent belt rows.

Although each belt row may include a single module defining the width of the belt, often each row includes a number of modules arranged side by side with a seam between them. Usually these belt modules composing the belt are arranged in a bricklay pattern to avoid a continuous longitudinal seam running the length of the belt. Such continuous seams would significantly decrease the beam strength of the belt. But, even in bricklayed modular belts, the seams in each row decrease the beam strength of the row. Furthermore, as the connecting hinge pins grow, the belt width can change because the modules have freedom to slide laterally and separate from each other at the seams. Besides varying the width of the belt, this separation can cause trip edges for products, pinch points for fingers, or gaps into which small conveyed products can fall or get caught.

Although most belt modules are made out of a homogenous material, such as metal or plastic, other belt modules are made of more than one material. For example, some belt modules include a resilient high-friction material molded, bonded, or otherwise attached to a slick low-friction plastic base. Belts made of these modules are useful, for example, in conveying articles up inclines and down declines. But complex molding techniques or messy secondary manufacturing steps are required to make the attachment.

To satisfy other applications, belt modules are often designed with moving parts that interact with conveyed products. Examples include belts with rollers for low backline pressure or for product indexing or offloading. Once again, special manufacturing or molding steps are necessary to install these moving parts. In the case of some modular plastic roller-top belts, rollers are mounted on a metal axle that extends through support stanchions spaced apart across the module. The module is manufactured by carefully molding the module and its stanchions around the axle and rollers. When the molding is complete, the axle is held permanently in the stanchions. If a roller or stanchion is damaged, the module has to be removed from the belt and replaced. Repair is not possible.

Thus, in view of these shortcomings, there is a need for a conveyor belt that may include a variety of accessories, even movable parts, and that is easy to manufacture and to repair in the field. There is also a need for a modular conveyor belt that exhibits even greater beam strength than a conventional bricklaid belt.

SUMMARY OF INVENTION

These needs and others are satisfied by a modular conveyor belt embodying features of the invention. In one version, the modular conveyor belt comprises a series of rows of belt module pieces. Each row includes first and second sets of hinge eyes along opposite first and second ends of the row. Each row also includes a group of first module pieces arranged side by side in the row and forming at least some of the first and second hinge eyes. Each row further includes a complementary group of second module pieces arranged across the row and forming other of the hinge eyes. The complementary group mates with the first group of pieces to form the belt row. The rows are then arranged end to end with the first set of hinge eyes of a row interleaved with the second set of hinge eyes of an adjacent row and pivotably connected together into a conveyor belt by hinge pins through the interleaved hinge eyes. In another version of this belt, the complementary group of second module pieces is stacked on the group of first module pieces. In yet another version, at least one of the second module pieces mates with portions of two side-by-side first module pieces. In another version, seams formed between adjacent first module pieces are offset laterally across the row from seams formed between second module pieces to avoid seams through the thickness of the row and hence increase beam strength.

In another conveyor belt version, the belt is made up of a bottom layer of belt module pieces and a top layer of belt module pieces. The pieces in each layer are arranged end to end and side to side in a bricklay pattern with seams between adjacent side-by-side module pieces. The top layer lies on the bottom layer. The two layers form rows of interleaved hinge eyes. Hinge pins extend through the hinge eyes of the top and bottom layers to connect them together in a conveyor belt.

In yet another belt version, a conveyor belt comprises a bottom layer of belt module pieces and a top layer of belt module pieces. The bottom layer includes belt module pieces arranged end to end and side to side in a bricklay pattern. The bottom layer extends in thickness from a bottom surface to a generally planar face. Vertical seams are formed through the thickness of the bottom layer between adjacent side-by-side module pieces. The belt module pieces in the top layer are also arranged end to end and side to side in a bricklay pattern. The top layer extends in thickness from a top surface to a generally planar face. Vertical seams are formed through the thickness of the top layer between adjacent side-by-side module pieces. The top layer mates with the bottom layer with the generally planar face of the top layer confronting the generally planar face of the bottom layer along a generally horizontal seam.

BRIEF DESCRIPTION OF DRAWINGS

These and other features, aspects, and advantages of the invention are described in more detail in the following description, appended claims, and accompanying drawings, in which:

DETAILED DESCRIPTION

Figure 1:
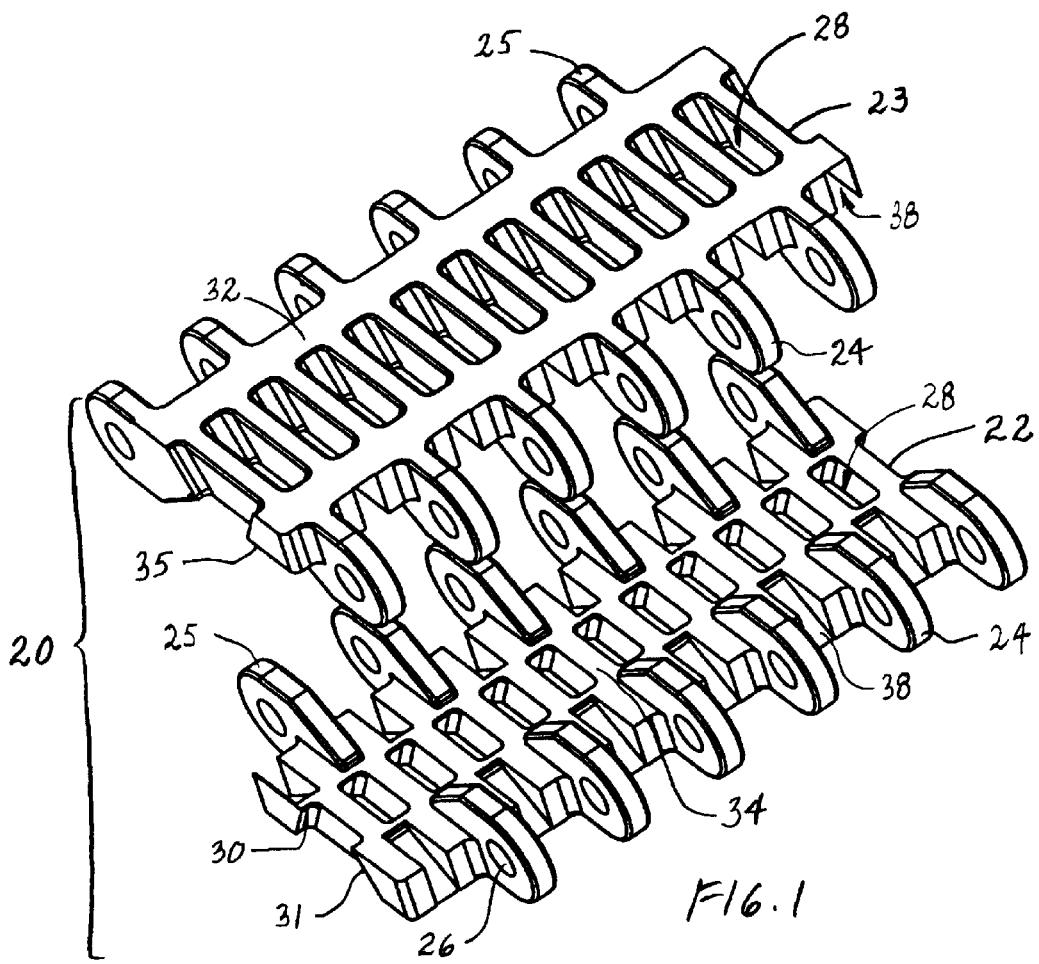
FIG. 1 is an exploded isometric view of a split conveyor belt module usable in a modular conveyor belt embodying features of the invention.
Figure 2:
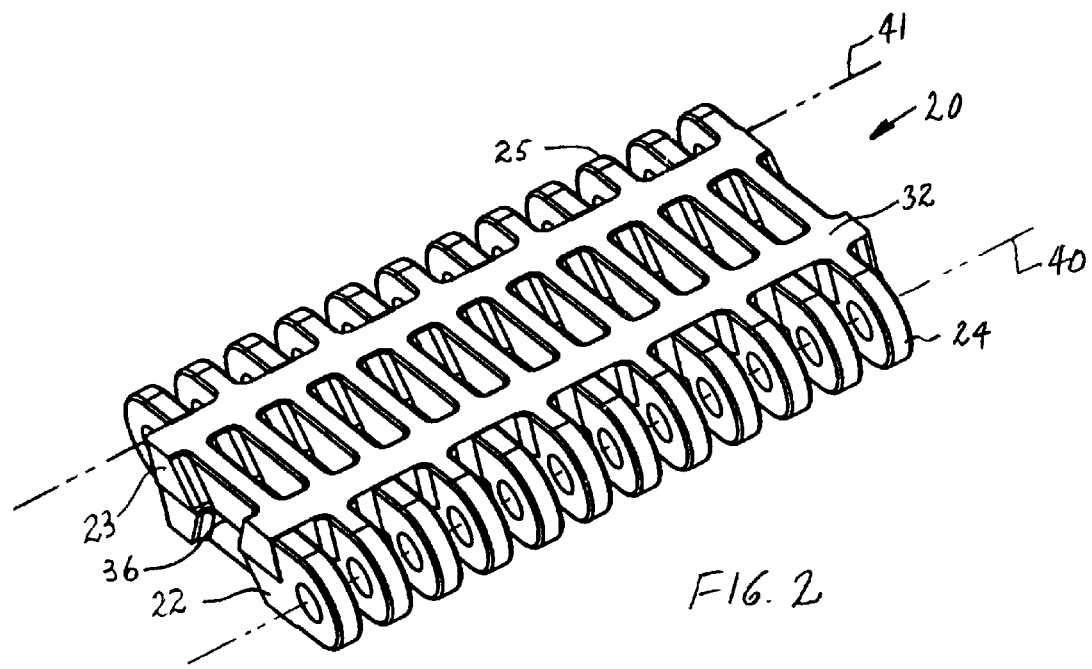
FIG. 2 is an unexploded isometric view of the split conveyor belt module of FIG. 1.

A split module for use in a modular conveyor belt having features of the invention is shown in FIGS. 1 and 2. The split module 20 is, in this example, made up of two pieces: a first piece 22 and a complementary second piece 23. Each piece includes first and second sets 24, 25 of hinge eyes along opposite first and second ends of the pieces. In this version of the split module, each piece has the same number of hinge eyes, six, along each end. As can also be seen, the first and second pieces are substantially identical in structure. The difference is that the two pieces are mirror images of each other. Each of the hinge eyes includes an aperture 26 aligned with the apertures in the other hinge eyes along that end. The aligned apertures receive a hinge pin that connects the pieces together and with other such split modules to form a conveyor belt. Each piece also has a series of trapezoidal cavities 28 spaced apart across the module body. Angled side surfaces 30, 31 of the cavities can serve as drive surfaces for engaging the teeth of sprockets (not shown) shaped to fit into the cavities. In this version of the split module, the first piece 22 is shown as a base piece with the complementary second piece 23 stacked atop it, but it is clear that the belt module is reversible and that the second piece could serve as the base piece and receive a driving force from sprockets. With the first piece as the base piece, the second complementary piece has a generally flat top surface 32 to serve as an article-engaging surface, in this case, to support conveyed articles. The two pieces mate along confronting planar faces 34, 35 that form a horizontal seam 36 through the module body. The hinge eyes of each piece are received in recesses 38 formed in the complementary piece. The hinge eyes of the first piece are alternately arranged with those of the second piece along each end when the pieces are mated. The first sets of hinge eyes along the first end of the mated module are aligned along a first axis 40; the second sets of hinge eyes along the second end are aligned along a second axis 41. A hinge pin extending through the aligned apertures retains the two mated pieces together as a single module.

Preferably, these belt module pieces are made of a thermoplastic material by injection molding. Common thermoplastic materials include polyethylene, polypropylene, acetal, nylon, and composite polymers with fillers. But other plastic or even non-plastic materials, such as metals, could be used and formed other than by injection molding to construct a module having the features of the invention. It is even possible to make the two pieces out of different materials. For example, the base piece could be made out of a stiff material with a relatively low coefficient of friction, such as the thermoplastic materials listed above, and the complementary piece made out of a more resilient material, such as a rubbery material, with a relatively high coefficient of friction. In this way, in a belt constructed of these modules, the base piece is adapted to receive driving forces and to slide easily along a supporting wear strip, while the high-friction piece can be used to prevent conveyed articles from sliding, such as in conveying articles up inclines. Thus, it is clear that complementary pieces having a variety of characteristics can be mated into a single module customized for a specific application.

Figure 3:
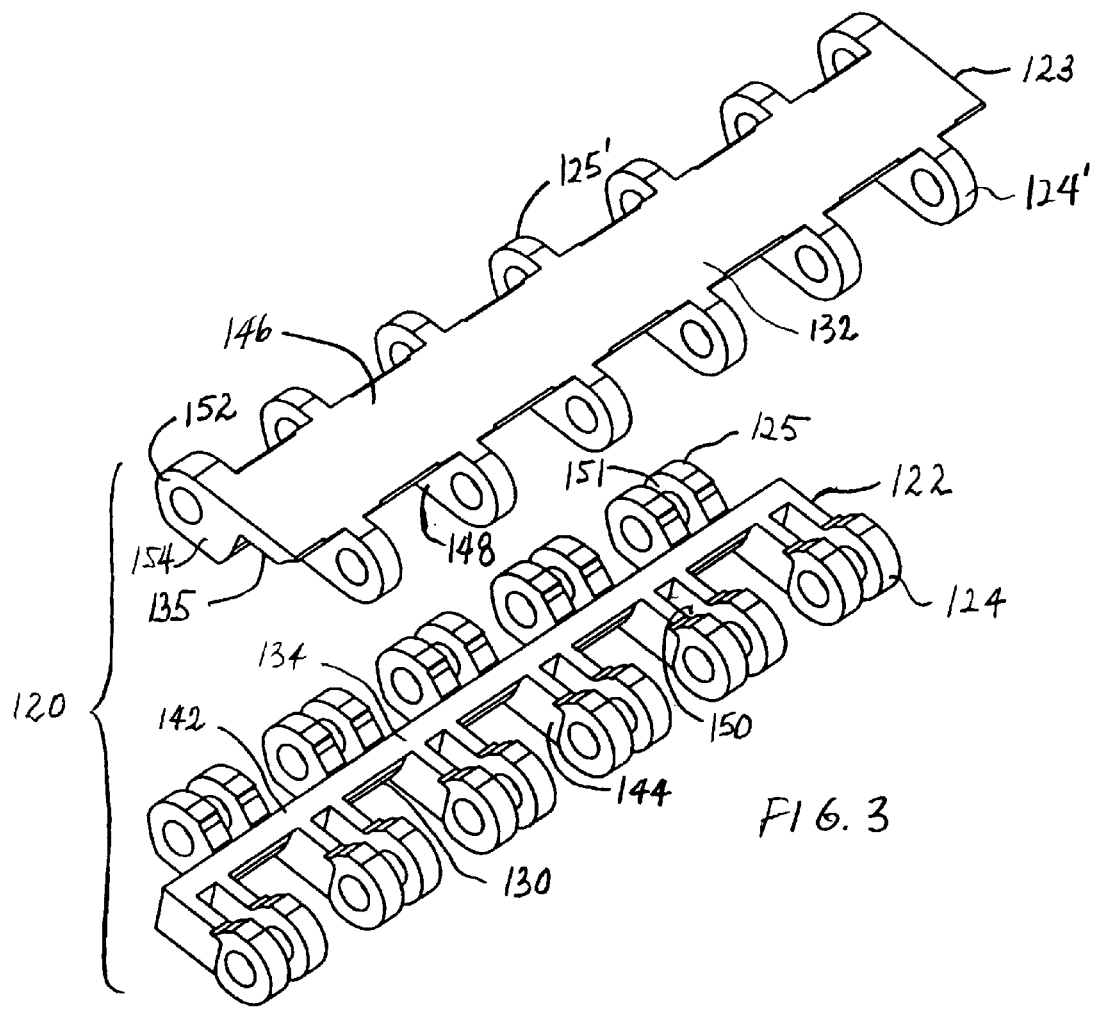
FIG. 3 is an exploded isometric view of another version of split conveyor belt module embodying features of the invention.
Figure 4:
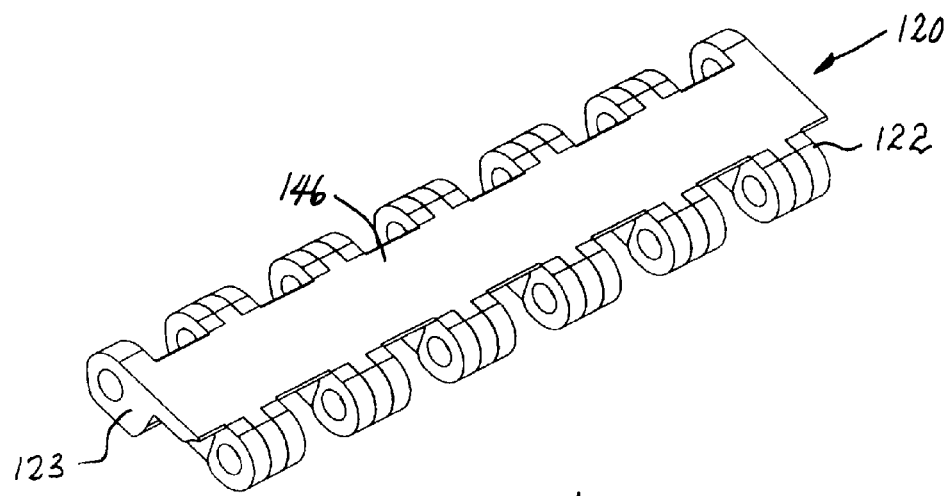
FIG. 4 is an unexploded isometric view of the split conveyor belt module of FIG. 3.

Another version of split module is shown in FIGS. 3 and 4. In this module 120, the two pieces 122, 123 differ from each other in a number of ways. First, the first piece 122 is a base piece whose body is formed mainly by a transverse bar 142 and legs 144 extending perpendicularly in pairs from one side of the bar. The tops of the bar and the legs form a coplanar face 134. An angled or curved surface 130 along the side of the transverse bar serves as a drive surface for the teeth of drive sprockets. A first set of hinge eyes 124 is formed at the first end of this base piece terminating the legs. A second set of hinge eyes 125 is formed along the opposite second end of the base piece. All the hinge eyes on the base piece are arranged in pairs. The second piece 123 of the split module extends from a first end with a first set of hinge eyes 124' to an opposite second end with a second set of hinge eyes 125'. The body is a generally flat-topped rectangular plate 146. The top surface 132 supports articles. Although the top surface in this example is flat, it is clear that it could include any number of surface characteristics, such as nubs, cones, or other textures. Likewise, it could be made out of a resilient material to provide a high-friction, no-slip conveying surface. Each of the first hinge elements 124' extends from a rib 148 that underlies the body and is sized to fit in the gap 150 between adjacent leg pairs in the base piece. The underside of the body is generally flat and forms a face 135 that rests on the face 134 of the base piece when the modules are mated. The base piece 122 receives the first and second sets of hinge eyes of the second piece 123 in the gaps 150, 151 formed between the individual pieces of the first and second sets of its hinge eyes. In this example, the base piece has about twice as many hinge eyes as the complementary second piece. Stacked one atop the other, the pieces form a module with thickened hinge eyes triple the thickness of the individual hinge eyes. The second piece also has a thickened hinge eye 152, as well as a flush surface 154, at its side edge.

Figure 5A:
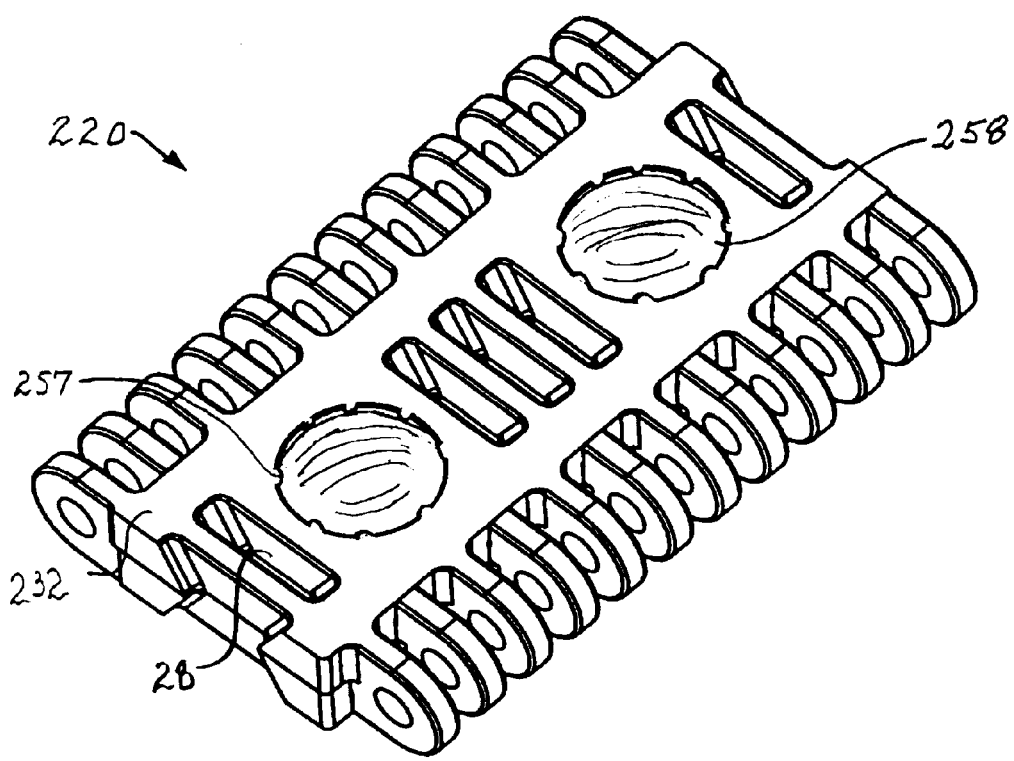
FIG. 5A is an isometric view of yet another version of split belt module, including a roller component, embodying features of the invention.
Figure 5D:
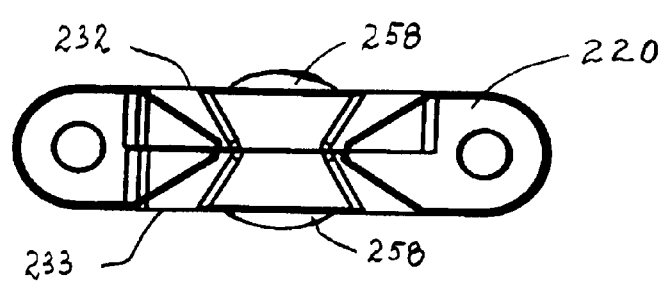
FIG. 5D is a side elevation view of the split module of FIG. 5A.
Figure 5B:
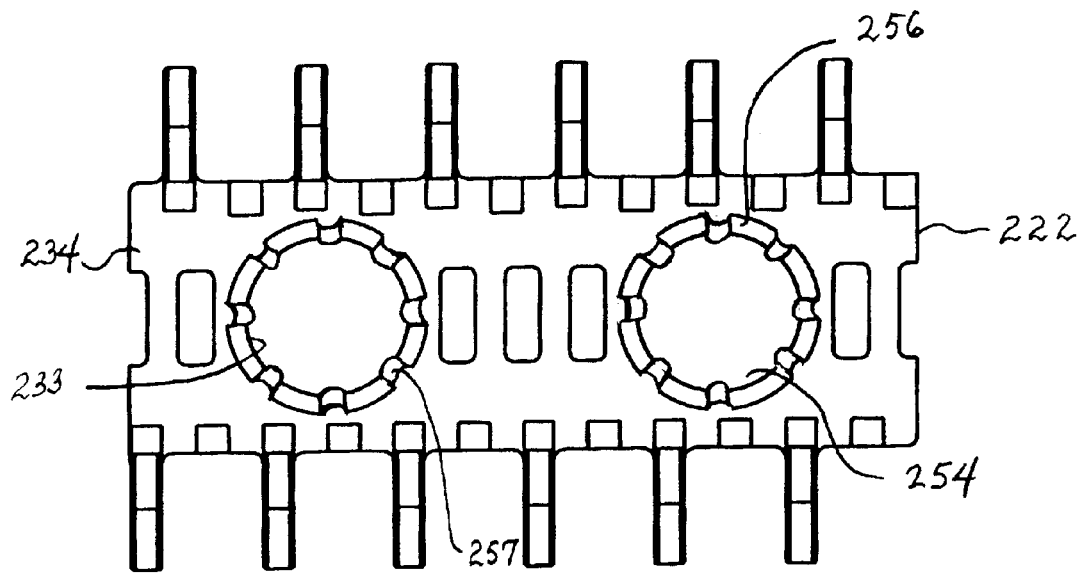
FIG. 5B is a top plan view of one of the pieces composing the split module of FIG. 5A.
Figure 5C:
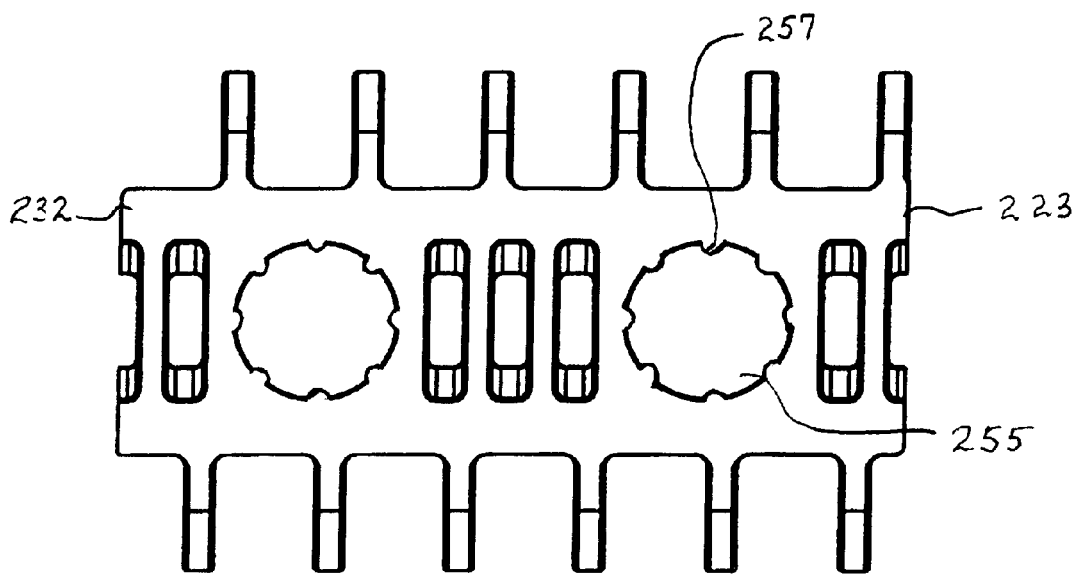
FIG. 5C is a top plan view of another of the pieces of the split module of FIG. 5A.

Still another version of split belt module is shown in FIGS. 5A–D. The module 220 is similar in most respects to the one in FIGS. 1 and 2. The main difference is that some of the trapezoidal cavities 28 in the body sections of the first and second pieces in FIG. 1 are replaced by openings 254, 255 in the first and second pieces 222, 223. The openings are wider at the confronting planar surfaces 234 than at the bottom surface 233 or the top surface 232, thereby forming a contoured wall 256 through the body sections of each piece. In a preferred version, this contour forms a latitudinal strip of a sphere. Rounded ribs 257 are formed longitudinally along the contoured wall. The split module includes a further component, in this example, a roller ball 258, in each receptacle formed in the module body when the two complementary pieces are mated. The ball, whose diameter is slightly less than that of the spherical contoured walls of each piece, is inserted in the opening 254 in the base piece 222 from the planar surface 234 before the pieces are mated. The ball rests on the ribs, which also provide a space between the ball and the wall through which grit and debris can fall to allow the ball to rotate freely. The diameter of the opening onto the bottom surface 233 is less than the diameter of the ball, which is less than the diameter of the opening at the planar surface. When the module halves, or pieces, are mated, the openings in each are aligned and the resulting receptacle retains the ball in position free to rotate universally. The contoured peripheral walls in each piece serve as retention structure to keep the ball in the mated module. The balls, which extend above the top surface 232 of the module, are effective in providing a rolling surface to articles conveyed on belts constructed of these modules. As shown in FIG. 5D, the balls also extend below the bottom surface 233 in this version. This allows the balls to be driven frictionally by contact with a transverse belt or a wear surface positioned beneath the belt.

Figure 6B:
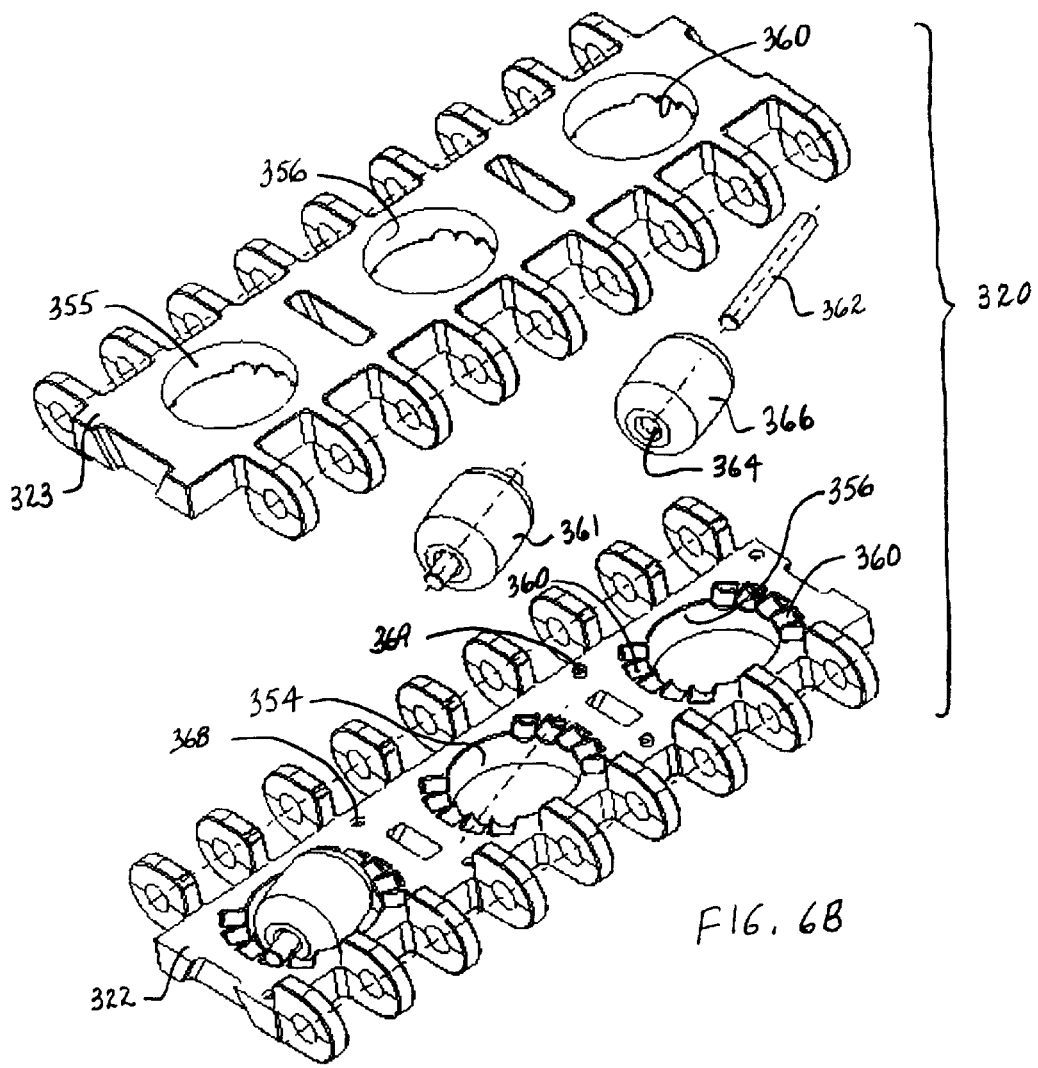
FIG. 6B is an exploded isometric view of the split module and roller assembly of FIG. 6A.
Figure 6A:
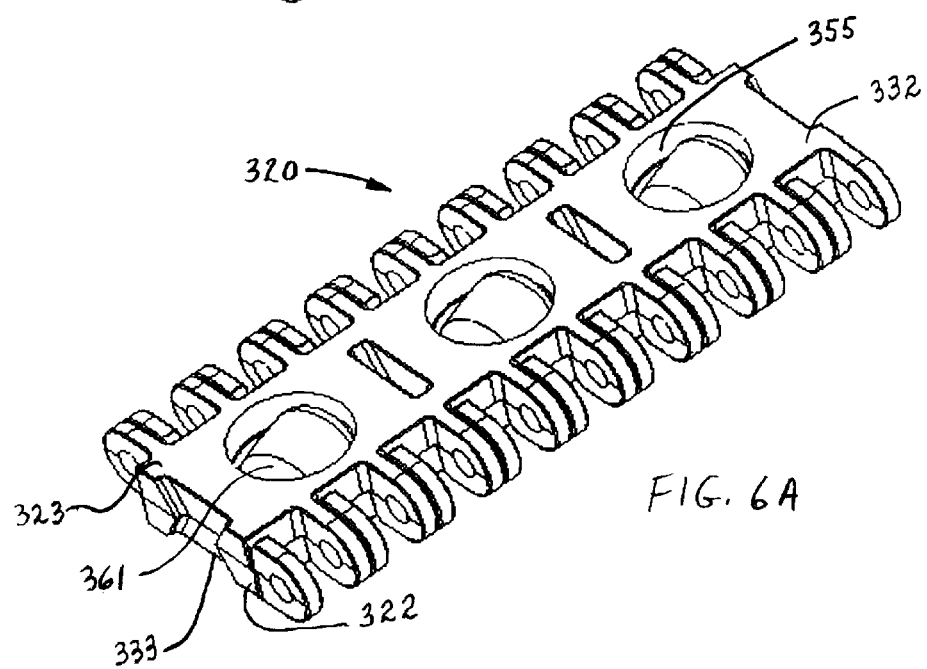
FIG. 6A is an isometric view of another version of split belt module, including a roller assembly component, embodying features of the invention.

Another version of split module is shown in FIGS. 6A–B. In this module 320, the openings 354, 355 are generally cylindrical with vertical walls 356. Indentations 360 are formed in each piece 322, 323 at opposite positions across the openings. In the version shown, the indentations are in the shape of half-cylinders to support and retain a roller assembly 361, comprising axles 362 extending through bores 364 in cylindrical rollers 366. When the module pieces are mated, the openings and indentations in each piece are aligned. The axles are sandwiched between the two pieces with the roller free to rotate about the axle. Thus, the roller assembly 361 is retained by the retention structure formed at the indentations in each module half. A salient portion of the roller protrudes above the top surface of the module 332 to engage articles in rolling contact. A salient portion could also protrude below the bottom surface 333 to frictionally engage a wearstrip, which would cause the rollers to roll as a belt made of these modules is driven along. The split module of FIGS. 6A–B is shown with five pairs of opposite indentations. This allows for five different angular orientations of the roller. With the axle in the two middle indentations, the rollers are in an in-line configuration for low back line pressure or for product acceleration. With the axles in any of the other indentations, the rollers are obliquely arranged for aligning conveyed articles. Although not shown, it would also be possible to arrange a pair of indentations on opposite sides of the openings in the direction of belt travel so that the rollers could be used to transfer articles off the sides. It would, of course, not be necessary to have all these angular options in one module. This version also has stubs 369 arranged on the confronting surfaces of each piece that fit into corresponding sockets 368 on the mating piece to help keep the pieces aligned together during assembly.

Figure 7:
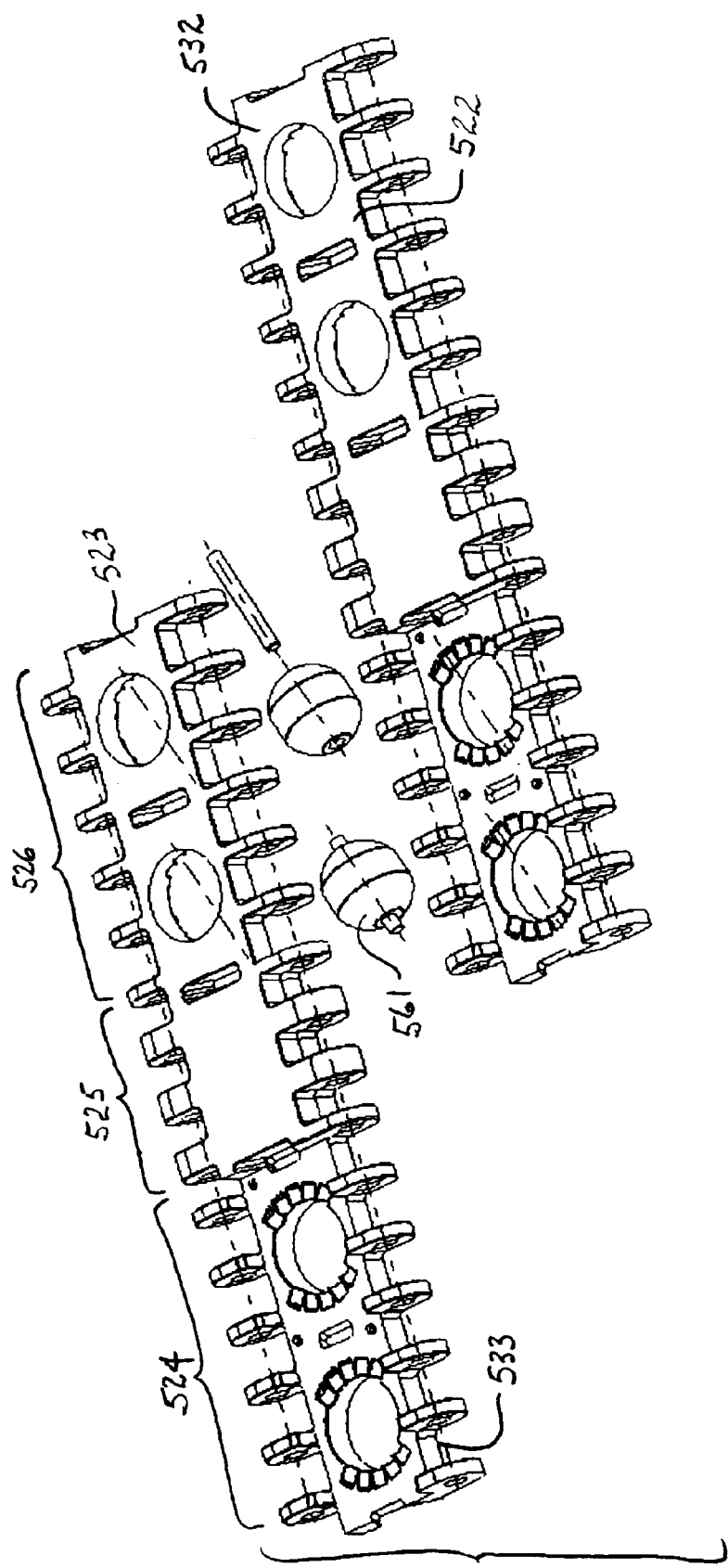
FIG. 7 is an exploded isometric view of yet another version with split module pieces accommodating rollers and embodying further features of the invention.

Another version of module piece is shown in FIG. 7. In this version, each module piece 522, 523 includes three sections 524, 525, 526. The first section 524 forms a portion of a bottom surface 533 on the left of the module pieces in FIG. 7. The third section 526 forms a portion of the top surface 532 on the right of the module pieces. The second intermediate section 525, situated between the first and third sections, forms portions of both the top and bottom surfaces. In this version, the two pieces are identical and can be mated in a staggered, overlapping arrangement, the third section 526 of one piece 523 positioned atop the first section 524 of the other piece 522. Any number of these pieces can be mated serially to form a conveyor belt row of a desired width. Top and bottom pieces 322, 323 as in FIG. 6B can be used at the sides of the outermost pieces 522, 523 of a belt row to complete the row. Unlike the module pieces shown in FIGS. 1–6, those of FIG. 7 each form substantial portions of both the top and the bottom surface.

Figure 8A:
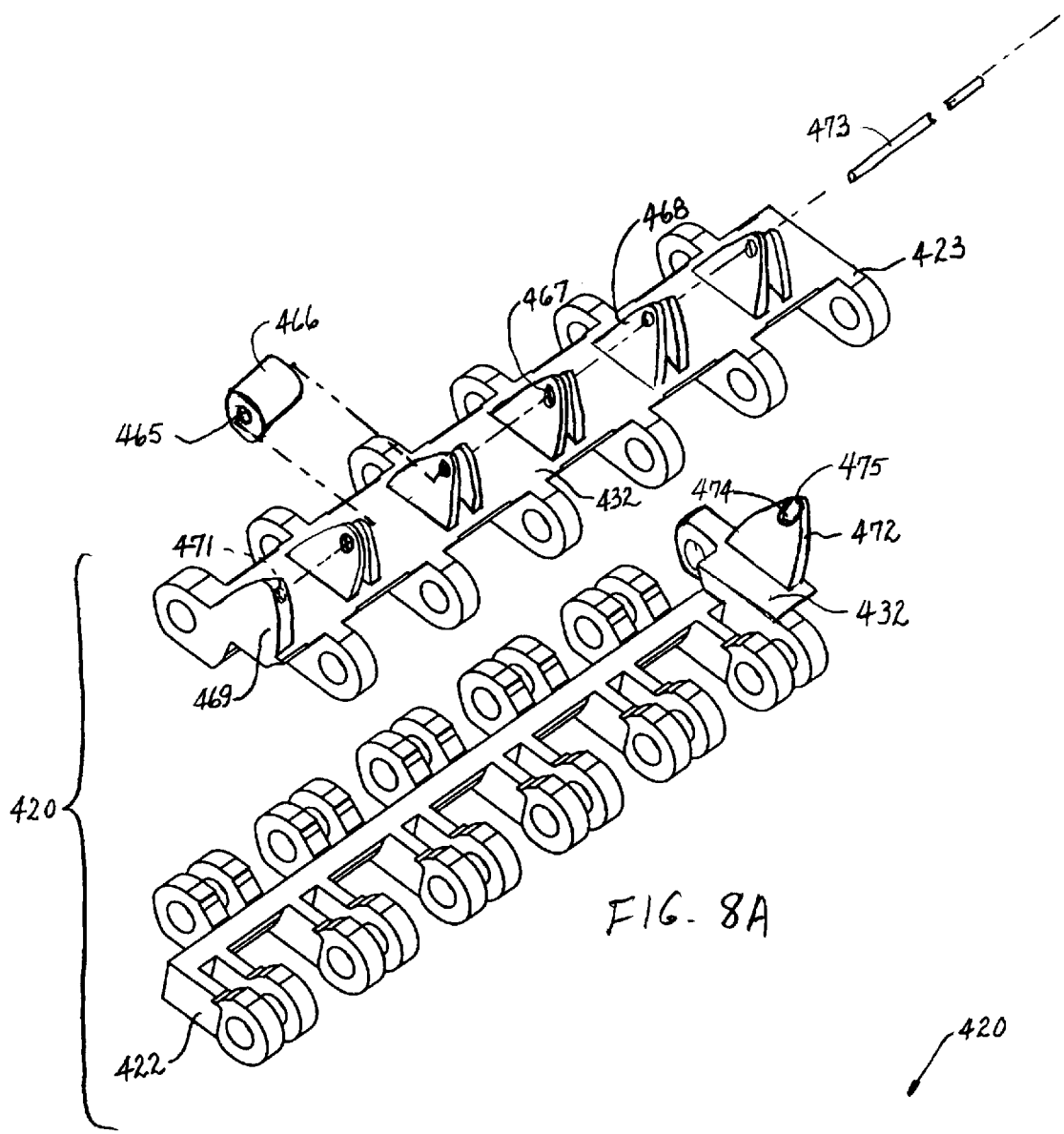
FIGS. 8A and 8B are isometric exploded and unexploded views of another version of split module, including rollers, embodying features of the invention.
Figure 8B:
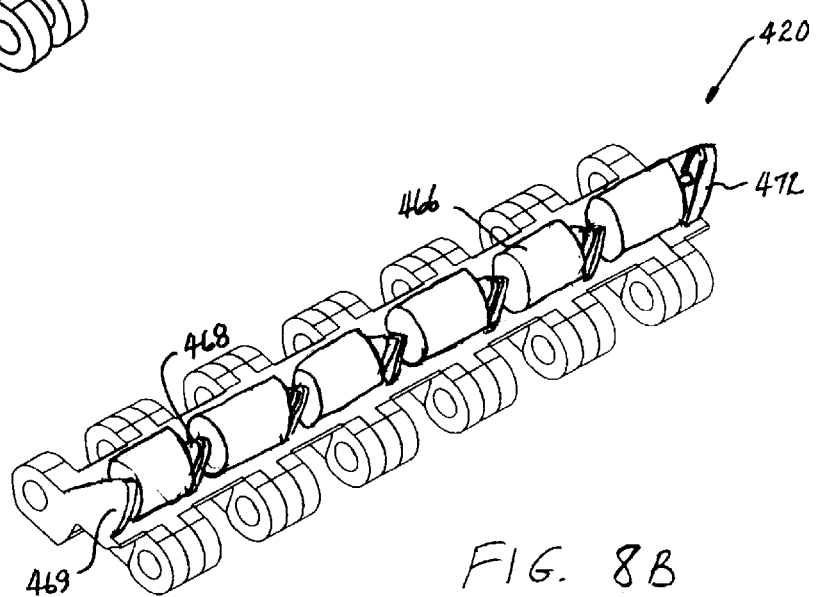

FIGS. 8A–B show yet another version of roller-top split module. In this version of the split module 420, the base piece 422 is similar to the base piece 122 in FIG. 3, and the complementary piece 423 is similar to the complementary piece 123 in FIG. 3. Extending upward from the top surface 432 of the complementary piece is support structure in the form of a row of stanchions 468 spaced apart across its width. A side support stanchion 469 is at one side edge of the piece. Aligned through holes 467 are formed in each of the stanchions, except for the side support stanchion, which has a blind-ended opening 471. An axle 473, such as a stainless steel rod, is inserted through the aligned holes and through the bores 465 of cylindrical rollers 466 and into the blind-ended opening to support the rollers rotatably between the stanchions. The base piece 422 includes at one side edge a portion of the top surface 432 of the module. (The other piece forms a majority of the top surface.) Extending upward from it is a side support stanchion 472 similar to that at the opposite side of the complementary piece. In the version shown, the side support stanchion 472 has a blind-ended hole 474 with an open upper side 475 to admit the end of the axle as the complementary piece is laid on the base piece. Once the pieces are mated, the blind-ended stanchions retain the axle and, thereby, the rollers in place. Thus, the side support stanchion 472 on the base piece serves as retention structure to keep the rollers in place. If the axle is bent, rollers are worn, or stanchions break, the top piece can be removed from the base piece and replaced by a new top piece.

Figure 9:
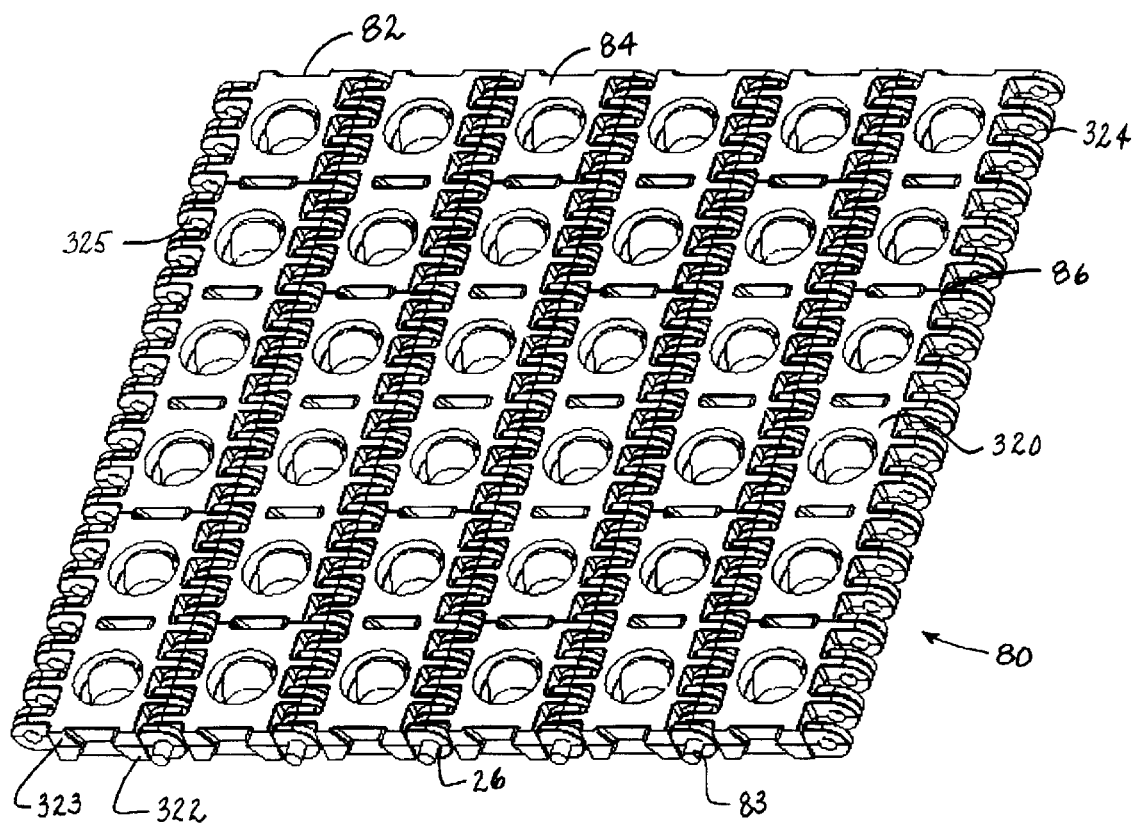
FIG. 9 is an isometric view of a portion of a modular conveyor belt constructed of modules such as those in FIG. 6A.

Any of the split modules described thus far can be connected together to construct a modular conveyor belt capable of conveying articles. A portion of such a conveyor belt 80 constructed of modules 320 as in FIGS. 6A–B is shown in FIG. 9. The belt portion includes a series of six rows 82 of modules. Although each row could include a single module across its width, it is also possible to arrange the modules side by side and end to end in a bricklay pattern, for instance, to construct a belt of a desired length and width. To achieve the bricklay pattern, modules of different widths are used. As shown, each row includes a first set of hinge eyes 324 along a first end and a second set of hinge eyes 325 along the opposite second end. A group of first module pieces 322 are arranged side by side in the row and form at least some of the first and second hinge eyes. A complementary group of second module pieces 323 are also arranged across the row and form other of the hinge eyes.

The first set of hinge eyes of a row are interleaved with the second set of hinge eyes of an adjacent row. Hinge pins 83 extending through aligned apertures 26 in the interleaved hinge eyes connect the first and second module pieces together and pivotably connect adjacent rows together into a modular conveyor belt. The belt extends through its thickness from a top article-engaging surface 84 to an opposite bottom surface, which includes drive structure for engagement with a drive element such as a toothed sprocket (not shown). Seams 86 are formed between adjacent side-by-side modules in each row. Thus, the conveyor belt of FIG. 9 is formed of a top layer of second module pieces arranged in a bricklay pattern stacked on a coextensive bottom layer of first module pieces, with roller components sandwiched between the layers. Because this version of belt is reversible, a salient portion of each roller extends above the top surface and below the bottom surface.

Figure 10:
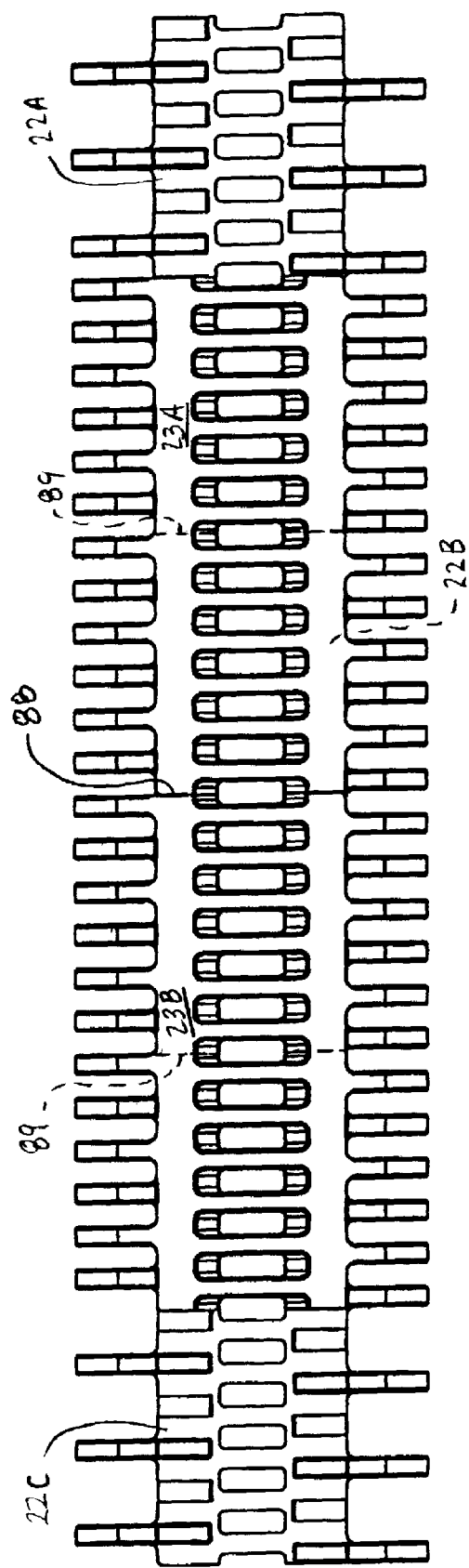
FIG. 10 is a top plan view of a partly assembled portion of a bricklayed belt row constructed of module pieces such as those in FIG. 1.

Although the two layers could each be made in identical bricklay patterns in which each top module piece resides exclusively on a corresponding bottom module piece, the two layers could be laid out in different bricklay patterns, as illustrated in FIG. 10 for a portion of one row constructed of module pieces such as those in FIGS. 1 and 2. In this arrangement, second module pieces 23A and 23B in the top layer have a seam 88 between them. First module pieces 22A, 22B, 22C forming the bottom layer have bottom seams 89 between side-by-side first module pieces. But the bricklay patterns of the top and bottom layers are such that the seams 88 on the top layer do not coincide with the seams 89 on the bottom layer. Thus, the second module piece 23A of the top layer mates with portions of the first module pieces 22A and 22B of the bottom layer. With the top and bottom seams offset laterally in this manner, seams extending all the way through the thickness of the belt are avoided, and the beam strength of the belt is increased.

Figure 11:
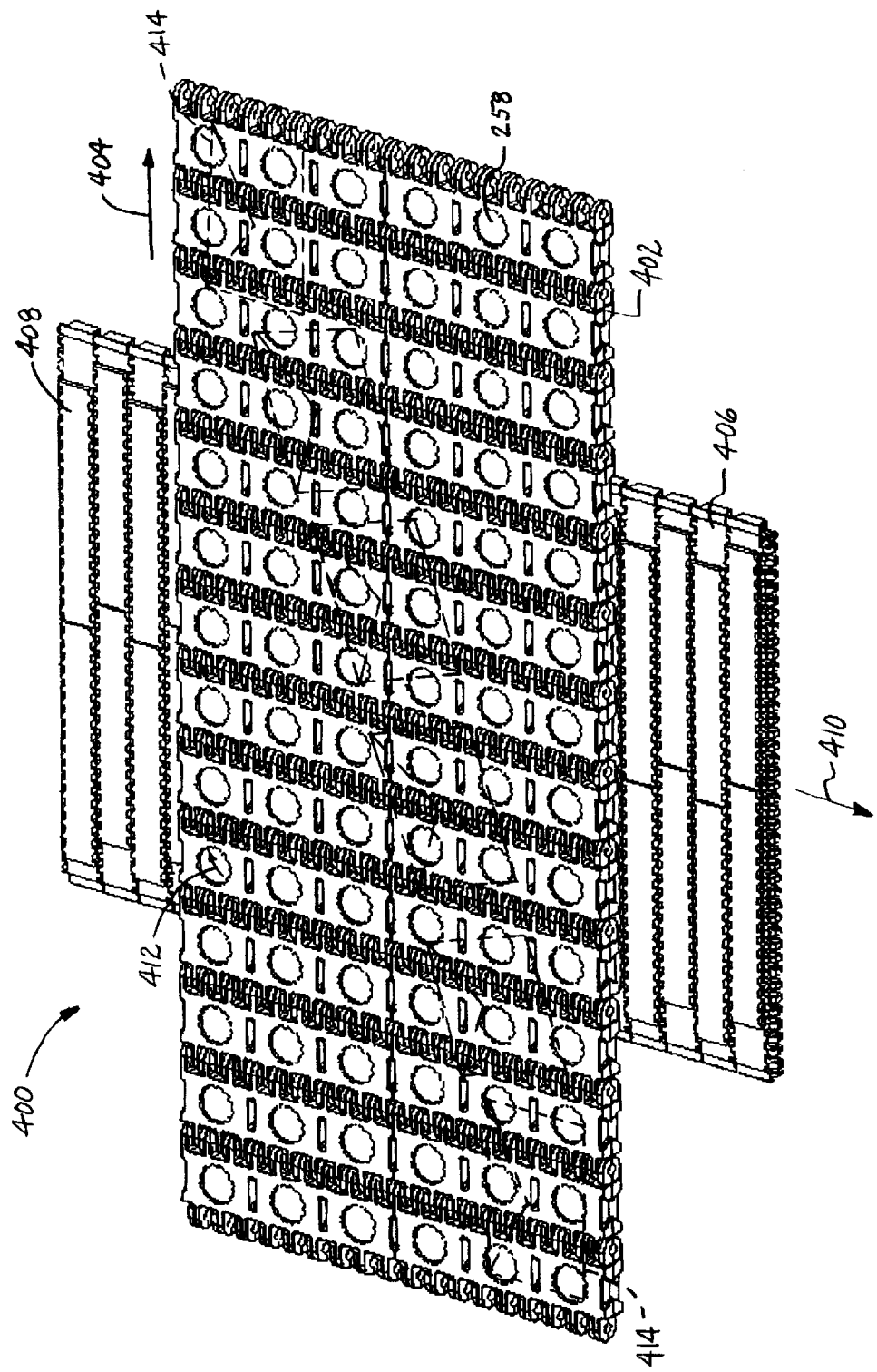
FIG. 11 is an isometric view of a portion of an aligning conveyor system using a belt constructed of the modules of FIGS. 5A–5D.

One use for a modular belt made of belt modules such as the split roller-ball modules of FIGS. 5A–D is in the conveyor system 400 of FIG. 11. The conveyor system includes an upper roller-ball conveyor belt 402 traveling in the direction of arrow 404. A second lower belt 406, such as a modular plastic conveyor belt topped with a high-friction surface 408, is positioned just below the conveyor belt so as to contact the salient portions of the roller balls 258 protruding through the bottom of the upper belt. (Suitable high-friction belts include the Series 900 Flat Friction Top and the Series 1100 Flush Grid Friction Top belts manufactured and sold by Intralox, Inc. of Harahan, La., USA.) In a preferred arrangement, the two belts are perpendicular to each other. While the lower belt is driven in the direction of arrow 410, the frictional contact between its high-friction surface and the bottoms of the roller balls in the upper belt rotates the balls generally in the direction of arrow 412. Articles, such as mail envelopes 414, conveyed on the upper belt are moved across the upper belt by the rotating roller balls. Thus, this conveyor could be used to align articles along one side of a belt or to transfer articles off the side of a belt. (Belt sideguards or conveyor frame side rails or conveyor off-transfer plates are not shown for simplicity.) Similarly, a belt such as the cylindrical roller-top belt of FIG. 9 could be used to align articles along one side of the belt in conjunction with a lower frictional belt or stationary wear surfaces beneath the roller-top belt in contact with the rollers protruding through the bottom surface of the belt. The rollers can be oriented all in the same oblique direction as in FIG. 9 to align articles along one side of the belt, or in one oblique direction on half the belt and the mirror-image direction on the other half to align articles along both sides or at the middle of the belt. With the axes of the rollers perpendicular to the direction of belt travel, the rollers can serve to separate conveyed articles by accelerating them as they come in contact with portions of the conveying path in which the rollers are in frictional rolling contact with wear surface material or the like.

Although the invention has been described in detail with respect to preferred versions, even other versions are possible. A wide variety of top article-engaging module pieces could be mixed and matched with an equally wide variety of base pieces. Flights, buckets, textured surfaces, and non-planar surfaces are examples of just some of the customized top pieces that could be made. Base pieces that accommodate a variety of sprockets or with various strength or friction characteristics could be made and combined with the variety of top pieces mentioned in this versatile split-module arrangement. Components other than cylindrical or spherical rollers could be retained by the mated module pieces. Pop-up shoes, flights, brakes, and levers are just some examples of belt components that can be retained by mating the module pieces. In most of the described examples, the first and second pieces were essentially top and bottom pieces, but it would also be possible to split the pieces along surfaces other than one about midway between the top and bottom surfaces. It would also be possible to make one or the other of the module pieces form hinge eyes along only one end and to interfit into its mating piece by means of other structure, such as tabs, stubs, or snap-ins. The hinge eyes illustrated in the examples completely surround the perimeter of the hinge pins, but hinge eyes with an open eye wall are also possible. Thus, as these few additional examples suggest, the scope of the claims should not be limited to the preferred versions.

What is claimed is:

1. A modular conveyor belt comprising:
   a series of rows of belt module pieces, each row including:
      a first set of hinge eyes along a first end of the row;
      a second set of hinge eyes along an opposite second end of the row;
      a group of first module pieces arranged side by side in the row and forming at least some of the first and second sets of hinge eyes;
      a complementary group of second module pieces arranged across the row and forming other of the first and second hinge eyes;
      wherein the complementary group of second module pieces is stacked on and mates with the group of first module pieces to form a belt row; and
   a plurality of hinge pins;
   wherein the first set of hinge eyes of a row are interleaved with the second set of hinge eyes of an adjacent row and wherein hinge pins extending through the interleaved hinge eyes connect the first module pieces of a row to the second module pieces of the row and pivotably connect consecutive rows into a conveyor belt.

2. A modular conveyor belt as in claim 1 wherein at least one of the second module pieces mates with portions of two side-by-side first module pieces.

3. A modular conveyor belt as in claim 1 wherein seams formed between adjacent first module pieces are offset laterally across the row from seams formed between second module pieces.

4. A modular conveyor belt as in claim 1 further comprising a component retained in place on the belt by the mating of the first and second module pieces.

5. A modular conveyor belt as in claim 4 wherein the component includes a roller.

6. A modular conveyor belt as in claim 1 wherein the first module pieces and the second module pieces are substantially identical in structure.

7. A modular conveyor belt as in claim 1 wherein the belt is reversible.

8. A conveyor belt, comprising:
   a bottom layer of belt module pieces arranged end to end and side to side in a bricklay pattern with seams between adjacent side-by-side module pieces;
   a top layer of belt module pieces arranged end to end and side to side in a bricklay pattern with seams between adjacent side-by-side module pieces, wherein the top layer lies on the bottom layer, together forming rows of interleaved hinge eyes; and
   a plurality of hinge pins extending through the hinge eyes of the top and bottom layers to connect the layers together into a conveyor belt.

9. A conveyor belt as in claim 8 wherein the seams in the top layer are offset from the seams in the bottom layer to avoid continuous seams through both layers of the belt.

10. A conveyor belt as in claim 8 wherein the belt is reversible top to bottom.

11. A conveyor belt as in claim 8 wherein the top layer and the bottom layer meet along confronting planar faces.

12. A conveyor belt as in claim 8 further comprising a component sandwiched in place between the top layer and the bottom layer.

13. A conveyor belt, comprising:
   a bottom layer of belt module pieces arranged end to end and side to side in a bricklay pattern, the bottom layer extending in thickness from a bottom surface to a generally planar face with vertical seams through the thickness of the bottom layer between adjacent side-by-side module pieces;
   a top layer of belt module pieces arranged end to end and side to side in a bricklay pattern, the top layer extending in thickness from a top surface to a generally planar face with vertical seams through the thickness of the top layer between adjacent side-by-side module pieces;
   wherein the top layer mates with the bottom layer with the generally planar face of the top layer confronting the generally planar face of the bottom layer along a generally horizontal seam.

14. A conveyor belt as in claim 13 further comprising a plurality of hinge pins and wherein the top layer and the bottom layer each include end-to-end rows of side-by-side belt module pieces forming along opposite ends between adjacent rows aligned hinge eyes for receiving the plurality of hinge pins.

15. A conveyor belt as in claim 13 further comprising a component sandwiched in place between the top layer and the bottom layer.

16. A conveyor belt as in claim 13 wherein the vertical seams in the top layer are offset from the vertical seams in the bottom layer to avoid continuous vertical seams through both layers of the belt.

17. A conveyor belt as in claim 13 wherein the belt is reversible top to bottom.

* * * * *